(12) United States Patent  
Yoshitsuru et al.

(10) Patent No.: US 9,139,116 B2  
(45) Date of Patent: Sep. 22, 2015

(54) VEHICLE SEAT

(71) Applicants: SUZUKI MOTOR CORPORATION, Shizuoka-ken (JP); NHK SPRING CO., LTD., Kanagawa-ken (JP)

(72) Inventors: Masaya Yoshitsuru, Shizuoka-ken (JP); Ryusuke Nishioka, Kanagawa-ken (JP)

(73) Assignees: Suzuki Motor Corporation, Shizouka-ken (JP); NHK Spring Co., Ltd., Kanagawa-ken (JP)

( * ) Notice: Subject to any disclaimer, the term of this patent is extended or adjusted under 35 U.S.C. 154(b) by 180 days.

(21) Appl. No.: 13/940,929

(22) Filed: Jul. 12, 2013

(65) Prior Publication Data

US 2014/0042784 A1 Feb. 13, 2014

(30) Foreign Application Priority Data

Aug. 7, 2012 (JP) ................................. 2012-174955

(51) Int. Cl.
| | |
|---|---|
| *B60N 2/08* | (2006.01) |
| *B60N 2/42* | (2006.01) |
| *B60N 2/68* | (2006.01) |
| *B60N 2/28* | (2006.01) |

(52) U.S. Cl.  
CPC ................ *B60N 2/43* (2013.01); *B60N 2/0881* (2013.01); *B60N 2/2893* (2013.01); *B60N 2/4221* (2013.01); *B60N 2/68* (2013.01)

(58) Field of Classification Search  
CPC .................................................. B60N 2/42763  
USPC .............. 297/216.16, 216.11, 216.19, 216.18  
See application file for complete search history.

(56) References Cited

U.S. PATENT DOCUMENTS

| 6,824,187 | B2 * | 11/2004 | Motozawa et al. .......... 296/68.1 |
| 2007/0132286 | A1 * | 6/2007 | Taoka et al. ................. 297/216.1 |
| 2010/0072797 | A1 * | 3/2010 | Telesco ..................... 297/216.19 |

FOREIGN PATENT DOCUMENTS

JP 2002-240610 A 8/2002

* cited by examiner

*Primary Examiner* — Sarah B McPartlin  
(74) *Attorney, Agent, or Firm* — Alston & Bird LLP

(57) ABSTRACT

To provide a vehicle seat that can prevent a front end portion of a child restraint system from sinking downward into a seat cushion when a forward impact force is applied to a vehicle body, and can also reduce the number of components and achieve weight saving. The vehicle seat includes a seat cushion and a slide rail 2, a locking mechanism is provided at the slide rail 2, a lock release handle 3 is suspended between the pair of right and left slide rails 2, the lock release handle 3 includes a first handle portion 3A and a second handle portion 3B, a front end portion of a reinforcement 23 is fixed to a front panel 22, the reinforcement 23 is provided with a coupling surface 31 to which a device mechanism 40 is coupled, the coupling surface 31 is inclined forwardly upward, and the coupling surface 31 is located on a front outer side from the second handle portion 3B as viewed from a direction perpendicular to the coupling surface 31.

4 Claims, 8 Drawing Sheets

(COMPARATIVE EXAMPLE)

(COMPARATIVE EXAMPLE)

VEHICLE SEAT

CROSS-REFERENCE TO RELATED APPLICATIONS

The present application claims priority to Japanese Patent Application No. 2012-174955, filed Aug. 7, 2012, which is incorporated herein in its entirety.

TECHNICAL FIELD

The present invention relates to a vehicle seat including:
a seat cushion on which a child restraint system can be installed; and
a pair of right and left slide rails that support the seat cushion so as to be slidable in a seat front-rear direction.

BACKGROUND ART

A vehicle including the aforementioned vehicle seat needs to have such a structure that a child can be stably restrained by a child restraint system even when a forward impact force is applied to a vehicle body.

Thus, conventionally, an engagement portion is provided at a rear end portion of a seat cushion, and a hook is provided at a vehicle body floor as disclosed in Patent Document 1.

When a forward load is applied to the child restraint system by the impact force to move the seat cushion forward, the hook is engaged with the engagement portion to prevent the forward movement of the seat cushion, and thereby prevent the seat cushion from being deformed beyond a certain level.

SUMMARY OF INVENTION

Problems to be Solved by the Invention

In accordance with the aforementioned conventional structure, although the seat cushion can be prevented from being deformed beyond a certain level when a forward impact force is applied to the vehicle body, there occurs a phenomenon in which a front end portion of the child restraint system sinks into the seat cushion due to a forward tensile load applied to the child restraint system.

That is, as shown in a state of a simulation test in FIG. 6, a child restraint system 90 is fixed to a seat cushion 1 at a lower end portion on a rear side (reference numeral 9 denotes a seatback, and 100 a vehicle seat). Therefore, when a load to a front side Z is applied to the child restraint system 90, the child restraint system 90 is rotated to the front side (a direction of an outlined arrow G) about a fixed portion P to the seat cushion 1. A front end portion of the child restraint system 90 thereby sinks into the seat cushion 1.

Generally, a seat frame includes a pair of right and left side frames, and a pipe material as a strength member that ensures the strength of the entire seat frame is suspended between front end portions of the pair of right and left side frames. The pipe material may be used to receive the front end portion of the child restraint system to prevent the front end portion from sinking downward into the seat cushion.

However, since a seat front-rear length of the child restraint system is less than a seat front-rear length of the seat cushion, the pipe material cannot receive the front end portion of the child restraint system.

Thus, to avoid the aforementioned sinking phenomenon, a strength member (a component denoted by reference numeral 88 in FIG. 6) that prevents the child restraint system from sinking needs to be further provided at the seat frame in addition to the pipe material. As a result, the number of components and the weight are increased.

It is an object of the present invention to provide a vehicle seat which can prevent a front end portion of a child restraint system from sinking downward into a seat cushion when a forward impact force is applied to a vehicle body, and can also reduce the number of components and achieve weight saving.

Means for Solving the Problems

The present invention is characterized in a vehicle seat including:
a seat cushion on which a child restraint system can be installed; and
a pair of right and left slide rails that support the seat cushion so as to be slidable in a seat front-rear direction,
wherein locking mechanisms that lock the seat cushion to prevent the sliding of the seat cushion on the slide rails are provided at the pair of right and left slide rails,
a lock release handle that releases the lock by the locking mechanisms is suspended between the pair of right and left slide rails,
the lock release handle includes a first handle portion on a seat-widthwise center side, and a second handle portion that is located on a seat-widthwise outer side from the first handle portion, and extends obliquely backward from an end portion of the first handle portion so as to be located closer to a seat rear side toward the seat-widthwise outer side,
a seat frame of the seat cushion includes
a pair of right and left side frames,
a front panel that is suspended between front end portions of the pair of right and left side frames to form a front surface portion of the seat frame, and
a reinforcement that is suspended between front portions of the pair of right and left side frames so as to be located on the seat rear side from the front panel, and prevents a front end portion of the child restraint system from sinking downward into the seat cushion,
a front end portion of the reinforcement is fixed to the front panel,
the reinforcement is provided with a coupling surface to which a device mechanism is coupled from below,
the coupling surface is inclined forwardly upward so as to be located upward toward a seat front side, and
the coupling surface is located on a front outer side from the second handle portion as viewed from a direction perpendicular to the coupling surface.

In accordance with the aforementioned configuration, the reinforcement of the seat frame is suspended between the front portions of the pair of right and left side frames so as to be located on the seat rear side from the front panel that forms the front surface portion of the seat frame. The reinforcement prevents the front end portion of the child restraint system from sinking downward into the seat cushion. Therefore, even when a forward impact force is applied to a vehicle body to apply a load to a front side to the child restraint system installed on the seat cushion, the front end portion of the child restraint system can be prevented from sinking into the seat cushion, so that a child can be stably restrained by the child restraint system.

Also, since the front end portion of the reinforcement is fixed to the front panel, the reinforcement also functions as a strength member that ensures the strength of the entire seat frame. Accordingly, a pipe material as a strength member that is suspended between the front end portions of the pair of right and left side frames can be omitted, thereby reducing the number of components and achieving weight saving.

Furthermore, at a front portion of the seat frame, a reinforcement structure having an L shape in section is formed by the reinforcement and the front panel from a position where the front end portion side of the child restraint system is arranged to the front surface side of the seat frame. As a result, the reinforcement structure has a box-like shape that opens on a lower side and a rear side. Therefore, even when the reinforcement and the front panel are formed of a panel material, the reinforcement structure can be provided with high strength, and as compared to a case in which the reinforcement structure is formed of a pipe material, the reinforcement structure can be reduced in weight.

On the other hand, a new problem occurs in the structure in which the pipe material is omitted. That is, the device mechanism such as a tilt mechanism is normally coupled to a bracket fixed to the pipe material. Therefore, in the case of the structure in which the pipe material is omitted, the device mechanism is coupled to the reinforcement. However, a main portion of the reinforcement where a wide coupling surface can be ensured with respect to the device mechanism is arranged to the seat rear side from a position where the pipe material is arranged in alignment with the front end portion of the child restraint system. Thus, there occurs a problem that a tool cannot be allowed to reach the coupling surface side of the reinforcement since the lock release handle becomes an obstacle in a coupling operation of the device mechanism to the reinforcement.

On the other hand, in the aforementioned configuration of the present invention, the reinforcement extends to the front panel side. Furthermore, the coupling surface of the reinforcement to which the device mechanism is coupled from below is inclined forwardly upward so as to be located upward toward the seat front side, and the coupling surface is located on the front outer side from the second handle portion as viewed from the direction perpendicular to the coupling surface.

Therefore, when the device mechanism is coupled to the coupling surface of the reinforcement from below, a tool insertion space can be ensured. As a result, interference of the tool with the second handle portion can be avoided, and the tool can be caused to smoothly reach the coupling surface side of the reinforcement. Accordingly, the device mechanism can be coupled to the coupling surface of the reinforcement. That is, deterioration in the mountability of the device mechanism to the reinforcement can be avoided, ensuring the mountability.

Although the device mechanism is coupled to the bracket fixed to the pipe material in the conventional case, the device mechanism is coupled to the coupling surface of the reinforcement in the aforementioned configuration of the present invention, so that the bracket is not required. As a result, the number of components, the weight, and the labor can be further reduced.

In the present invention,
the device mechanism is a tilt mechanism including a link mechanism that is interposed between the slide rail and the reinforcement, and raising and lowering means that raises and lowers a front end portion of the seat cushion,
the link mechanism is composed of a lower-side link member and an upper-side link member coupled together rotatably about a lateral axis,
a lower end portion of the lower-side link member is coupled to the slide rail rotatably about a lateral axis, and
an upper end portion of the upper-side link member is coupled to the coupling surface of the reinforcement, so that following advantages can be obtained.

The tilt mechanism can adjust a seat angle of the seat cushion according to preference.

Also, the link mechanism of the tilt mechanism can be arranged immediately below the reinforcement. Accordingly, when a forward load is applied to the child restraint system, the link mechanism can receive a load on the seat cushion in a direction in which the front end portion of the child restraint system sinks from immediately below.

Therefore, as compared to a case in which the link mechanism receives the load at a position other than from immediately below, a moment load is not applied to the link mechanism, so that a burden on the link mechanism can be reduced, and the durability of the tilt mechanism can be improved.

In the present invention,
the reinforcement is composed of a reinforcement upper wall, and a reinforcement front wall that extends downward from an end portion on the seat front side of the reinforcement upper wall,
the reinforcement front wall is inclined so as to be located closer to the seat front side toward a lower end portion side, and
the lower end portion of the reinforcement front wall is fixed to the front panel, so that following advantages can be obtained.

The reinforcement can be formed in an L shape in section by the reinforcement upper wall and the reinforcement front wall, thus improving strength. Moreover, since the reinforcement front wall is inclined so as to be located closer to the seat front side toward the lower end portion side, the reinforcement front wall more effectively acts as a strut against the front panel when, for example, the front end portion of the child restraint system is to sink into the seat cushion to apply a load to the reinforcement in a rotation direction to the front side. Accordingly, the strength of the reinforcement against the sinking of the front end portion of the seat cushion can be improved.

In the present invention,
the front panel is formed in an L shape in section, and is composed of a front panel upper wall, and a front panel front wall that extends downward from an end portion on the seat front side of the front panel upper wall, so that following advantages can be obtained.

Since the front panel is formed in an L shape in section, the strength of the front panel can be further improved.

Advantageous Effects of Invention

The present invention can provide
the vehicle seat which can prevent the front end portion of the child restraint system from sinking downward into the seat cushion when a forward impact force is applied to the vehicle body, and can also reduce the number of components and achieve the weight saving.

MODE FOR CARRYING OUT THE INVENTION

In the following, an embodiment of the present invention will be described based on the drawings.

Figure 4:
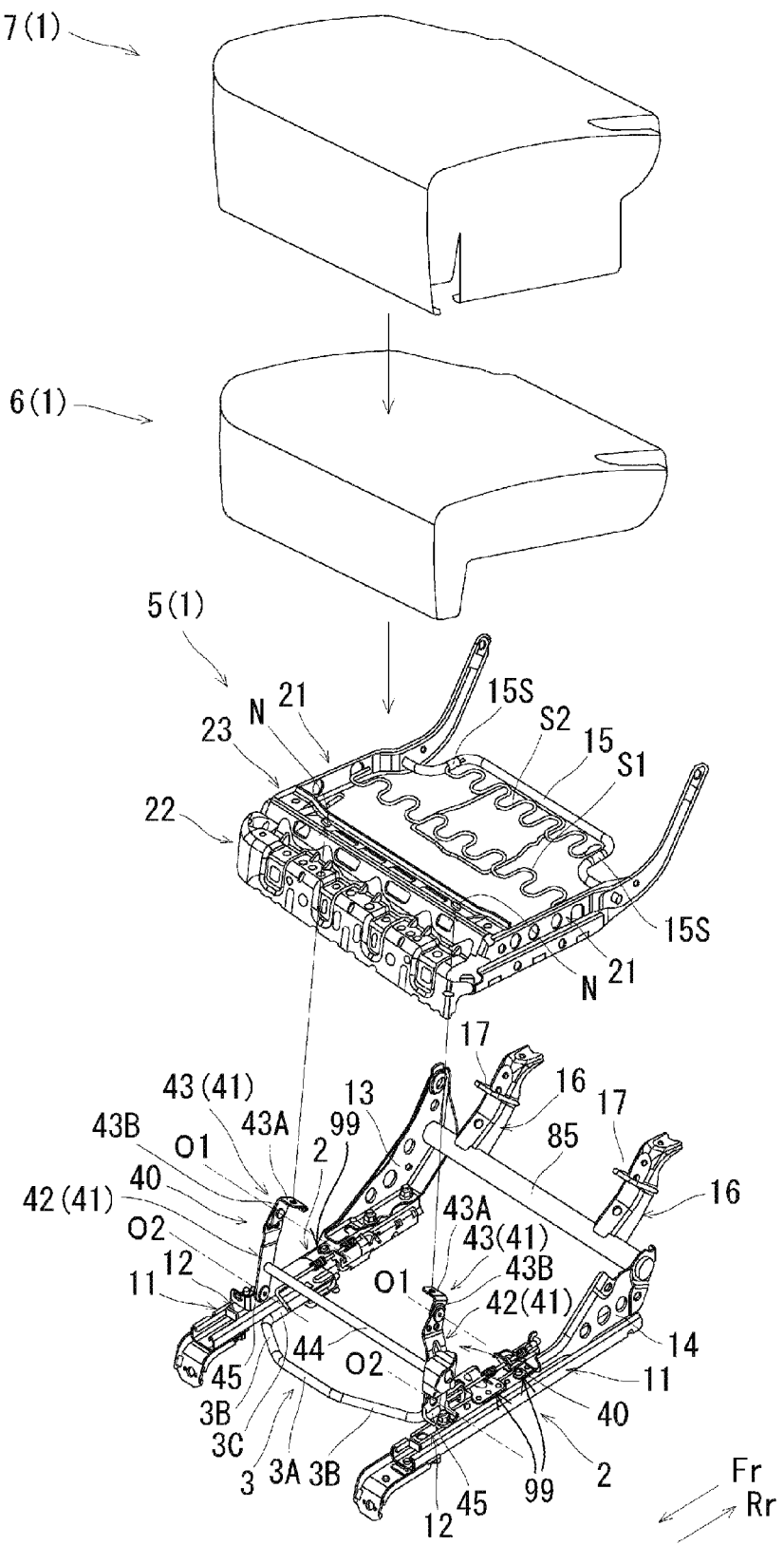
FIG. 4 is an exploded perspective view of a seat cushion and the slide rail.

FIG. 4 shows a seat cushion 1 of a vehicle seat that supports the thighs and the buttocks of a passenger, and a pair of right and left slide rails 2 that support the seat cushion 1 so as to be slidable in a seat front-rear direction.

The seat cushion 1 is composed of a seat frame 5 having a rectangular frame-like shape, a seat cushion pad 6 placed on the seat frame 5, and a seat cushion trim 7 (a cover material) that covers the seat cushion pad 6. The seat cushion 1 is configured such that a child restraint system (a child safety seat) can be installed thereon. The seat cushion pad 6 is formed of foamed urethane.

Structure of Slide Rail 2

The slide rail 2 is composed of a lower-side fixed rail 11 mounted to a vehicle body floor, and an upper-side movable rail 12 that slides on the fixed rail 11. Also, a hinge bracket 13 having a triangular shape in side view (viewed from a seat width direction) is erected on a rear end portion of the movable rail 12 on a right side, and a reclining bracket 14 having a triangular shape in side view is erected on a rear end portion of the movable rail 12 on a left side.

The hinge bracket 13 and the reclining bracket 14 are coupled via a first coupling pipe 85. A pair of right and left brackets 16 that support a board of a trunk are welded and fixed to the first coupling pipe 85. The bracket 16 extends backwardly upward from the first coupling pipe 85, and an annular anchor 17 for a child restraint system is welded and fixed to a longitudinal intermediate portion of the bracket 16. The child restraint system anchor 17 projects forwardly upward from the longitudinal intermediate portion of the bracket 16.

Locking mechanisms 99 that lock the sliding of the movable rails 12 with respect to the fixed rails 11 are provided at the pair of right and left slide rails 2. A bilaterally symmetrical lock release handle 3 for releasing the lock by the locking mechanisms 99 is suspended between the pair of right and left slide rails 2.

Figure 2:
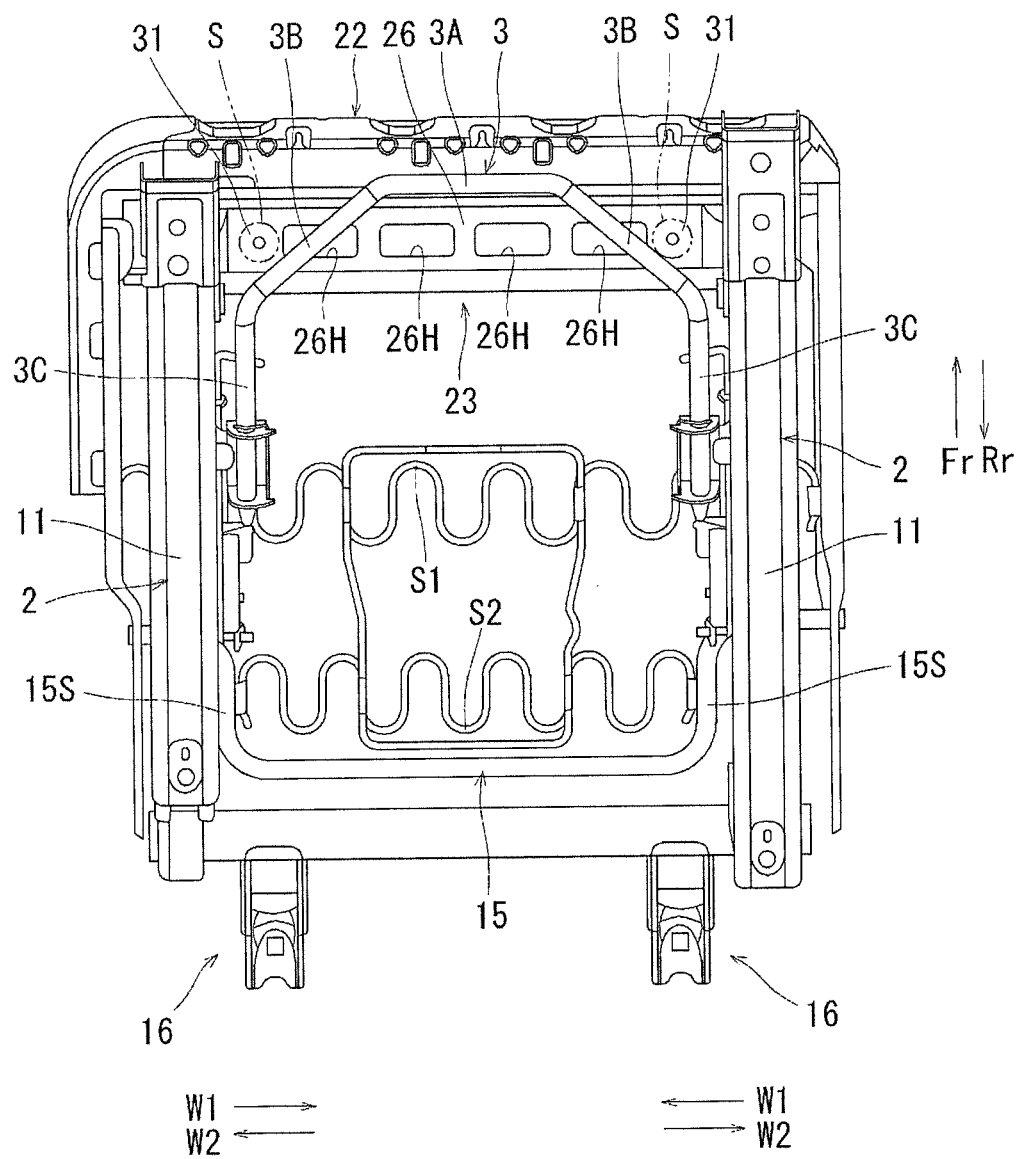
FIG. 2 is a view on an arrow A in FIG. 1.

As also shown in FIG. 2, the lock release handle 3 includes a first handle portion 3A on a seat-widthwise center side, a pair of right and left second handle portions 3B located on a seat-widthwise outer side W2 from the first handle portion 3A, and a third handle portion 3C that extends to a seat rear side Rr from an end portion on the seat-widthwise outer side W2 of the second handle portion 3B.

The first handle portion 3A extends along the seat width direction, and is configured as a grip portion gripped by a passenger. The second handle portion 3B extends obliquely backward from an end portion of the first handle portion 3A so as to be located closer to the seat rear side Rr toward the seat-widthwise outer side W2. The third handle portion 3C extends to the seat rear side Rr from the end portion on the seat rear side Rr of the second handle portion 3B.

Rear end portions (end portions on the seat rear side Rr) of the pair of right and left third handle portions 3C are coupled to the fixed rails 11 so as to be rotatable about a lateral axis, so that the lock release handle 3 maintains a substantially horizontal position during the lock by the locking mechanisms 99. The lock release handle 3 releases the lock by the locking mechanisms 99 when a passenger rotates the lock release handle 3 upward about the lateral axis.

Structure of Seat Frame 5

Figure 1:
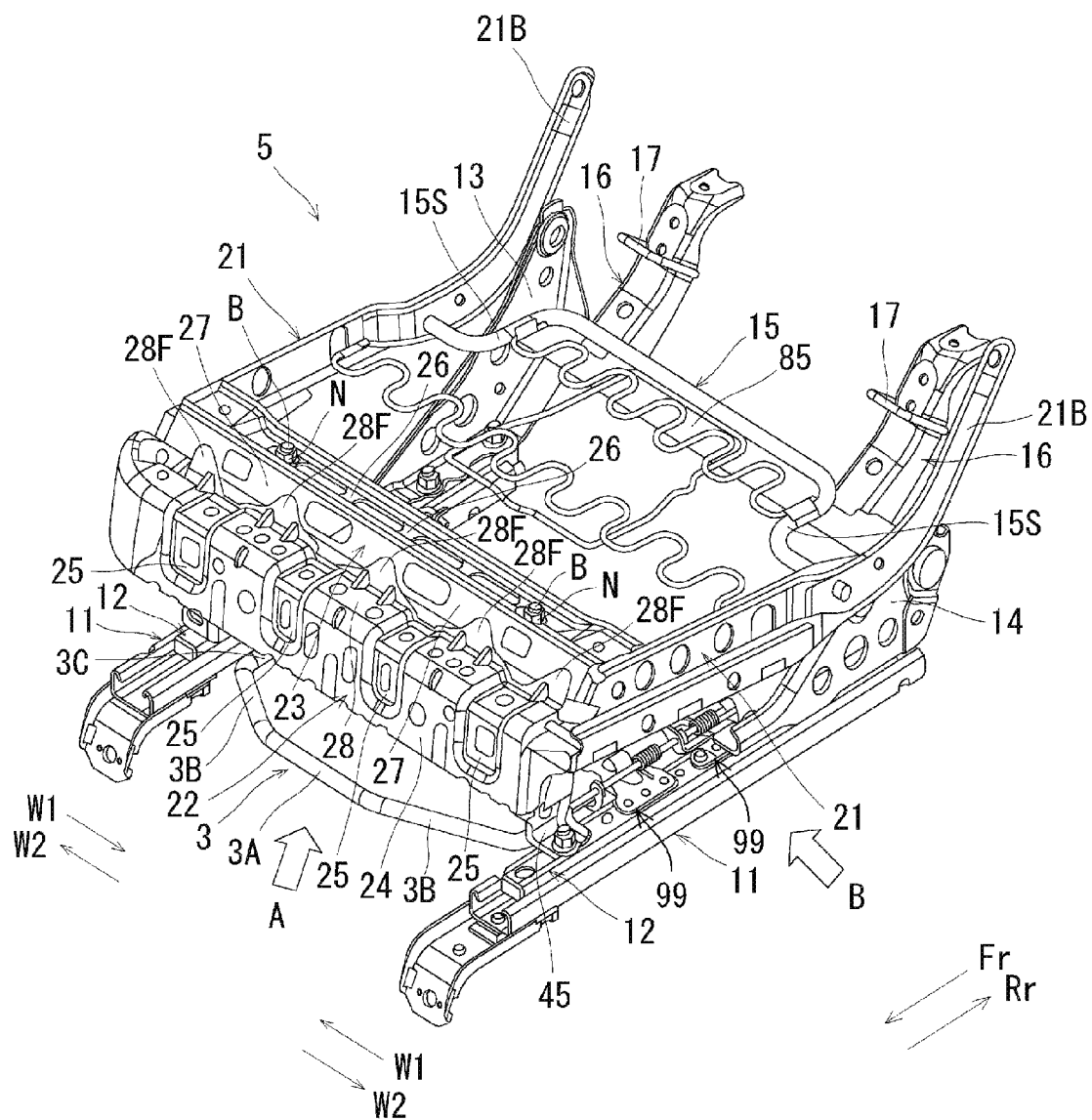
FIG. 1 is a perspective view of a seat frame and a slide rail in a mounted state.
Figure 5:
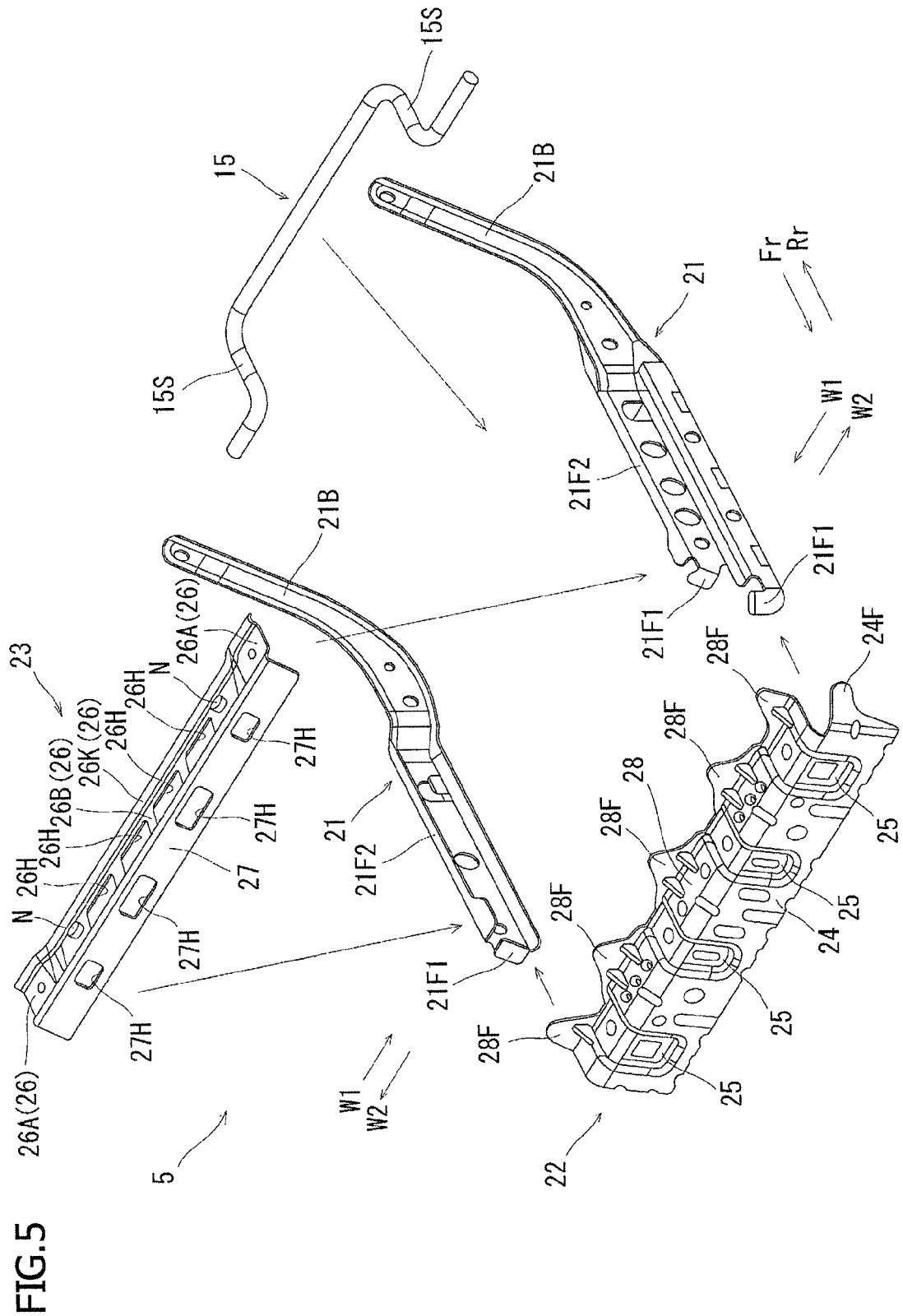
FIG. 5 is an exploded perspective view of the seat frame.
Figure 6:
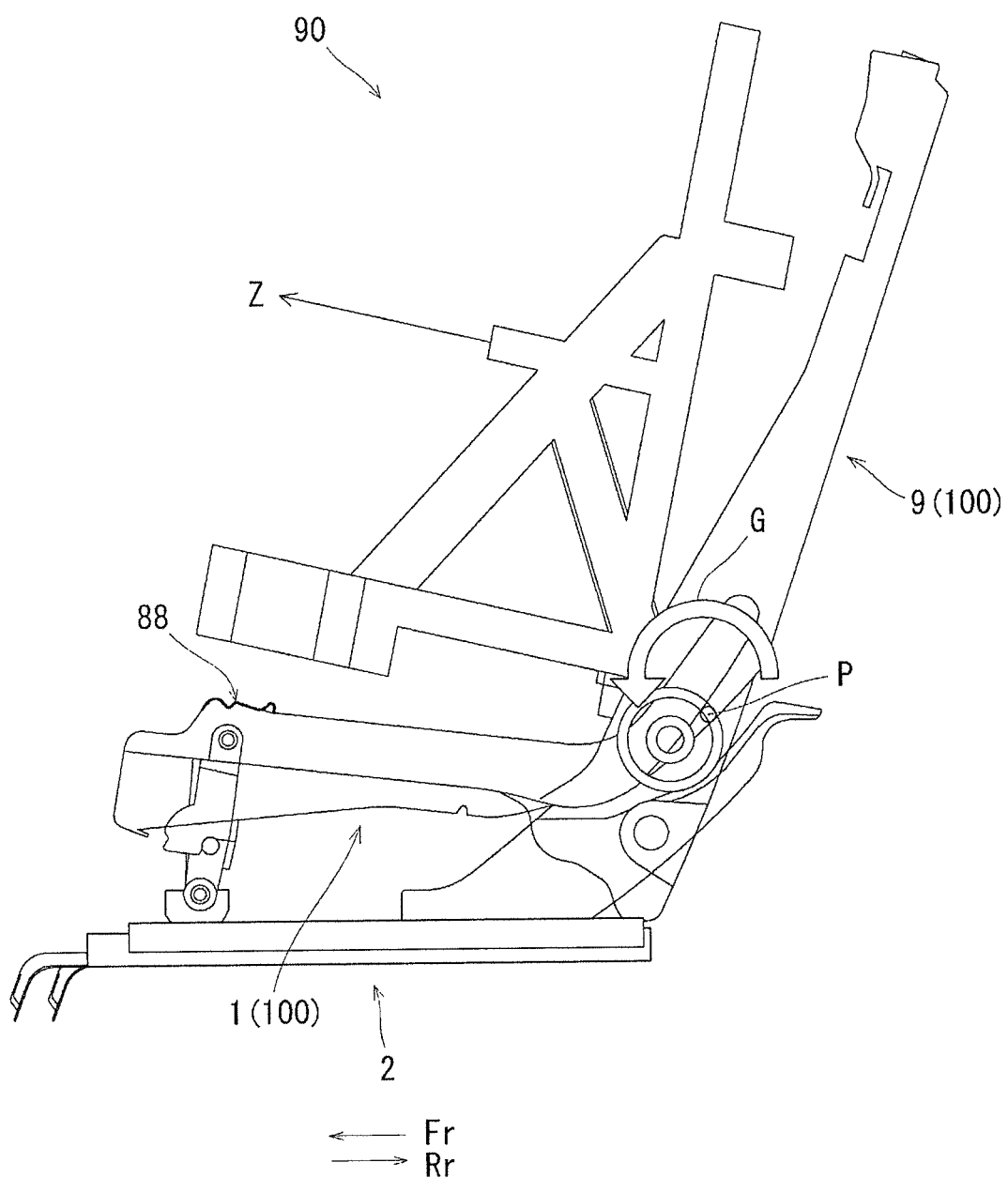
FIG. 6 is an operation view illustrating operation of a child restraint system to which a force toward a seat front side is applied (an operation view illustrating a state of a simulation test).

As shown in FIGS. 1, 4, and 5, the seat frame 5 includes a pair of right and left side panels 21 (corresponding to a side frame), a front panel 22 suspended between front end portions of the pair of right and left side panels 21 to form a front surface portion of the seat frame 5, a reinforcement 23 suspended between front portions of the pair of right and left side panels 21, and a second coupling pipe 15 suspended between rear end portions of the pair of right and left side panels 21.

Structure of Side Panel 21

A panel surface of the side panel 21 faces the seat width direction. A rear end portion 21 B of the side panel 21 is inclined backwardly upward so as to be located upward toward the seat rear side Rr, set to a smaller vertical width toward the seat rear side Rr, and coupled to a hinge mechanism for a seatback.

Upper-side first mounting flanges 21F1 project to a seat-widthwise inner side W1 from the front end portions of the pair of right and left side panels 21, and a lower-side first mounting flange 21F1 projects to the seat-widthwise inner side W1 from the front end portion of one (the left-side) side panel 21. Also, second mounting flanges 21F2 project to the seat-widthwise inner side W1 from upper end portions of the pair of right and left side panels 21.

A corrugated first spring S1 is suspended between longitudinal intermediate portions of the pair of right and left side panels 21. The second coupling pipe 15 is bent in a hat-like shape that opens on a seat front side Fr in plan view, and a corrugated second spring S2 is suspended between a pair of right and left pipe portions 15S extending along the seat front-rear direction.

Structure of Front Panel 22

As shown in FIGS. 1, 3(a), 3(b), 4, and 5, the front panel 22 is formed in an L shape in section, and is composed of a front panel upper wall 28, and a front panel front wall 24 that extends downward from an end portion on the seat front side Fr of the front panel upper wall 28. Accordingly, the strength of the front panel 22 can be improved.

A plurality of beads 25 are provided in parallel in the seat width direction in the front panel upper wall 28 and the front panel front wall 24 across both walls 24 and 28. Accordingly, the strength of the front panel 22 can be further improved. Also, a plurality of third mounting flanges 28F are erected in a corrugated shape from a rear end portion (an end portion on the seat rear side Rr) of the front panel upper wall 28. Furthermore, a fourth mounting flange 24F (see FIG. 5) extends to the seat rear side Rr from a seat-widthwise end portion of the front panel front wall 24.

Structure of Reinforcement 23

The reinforcement 23 is composed of a reinforcement upper wall 26, and a reinforcement front wall 27 that extends downward from an end portion on the seat front side Fr of the reinforcement upper wall 26. The reinforcement 23 is located on the seat rear side Rr from the front panel 22, and prevents a front end portion of the child restraint system from sinking downward into the seat cushion 1.

Figure 3A:
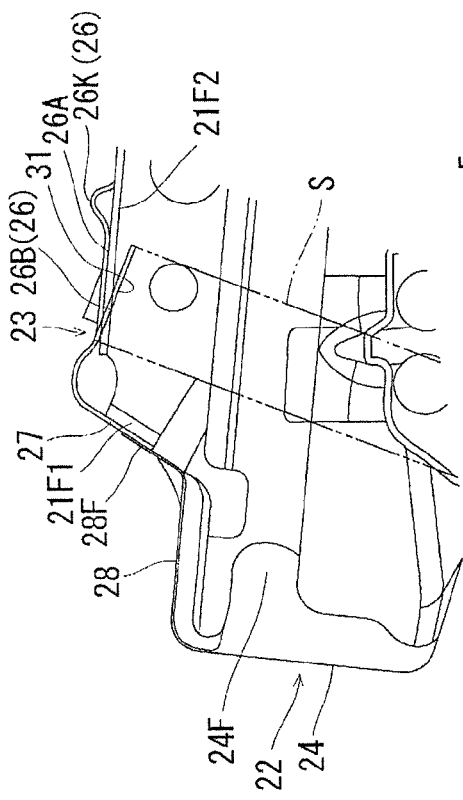
FIGS. 3a and 3b are views on an arrow B in FIG. 1.
Figure 3B:
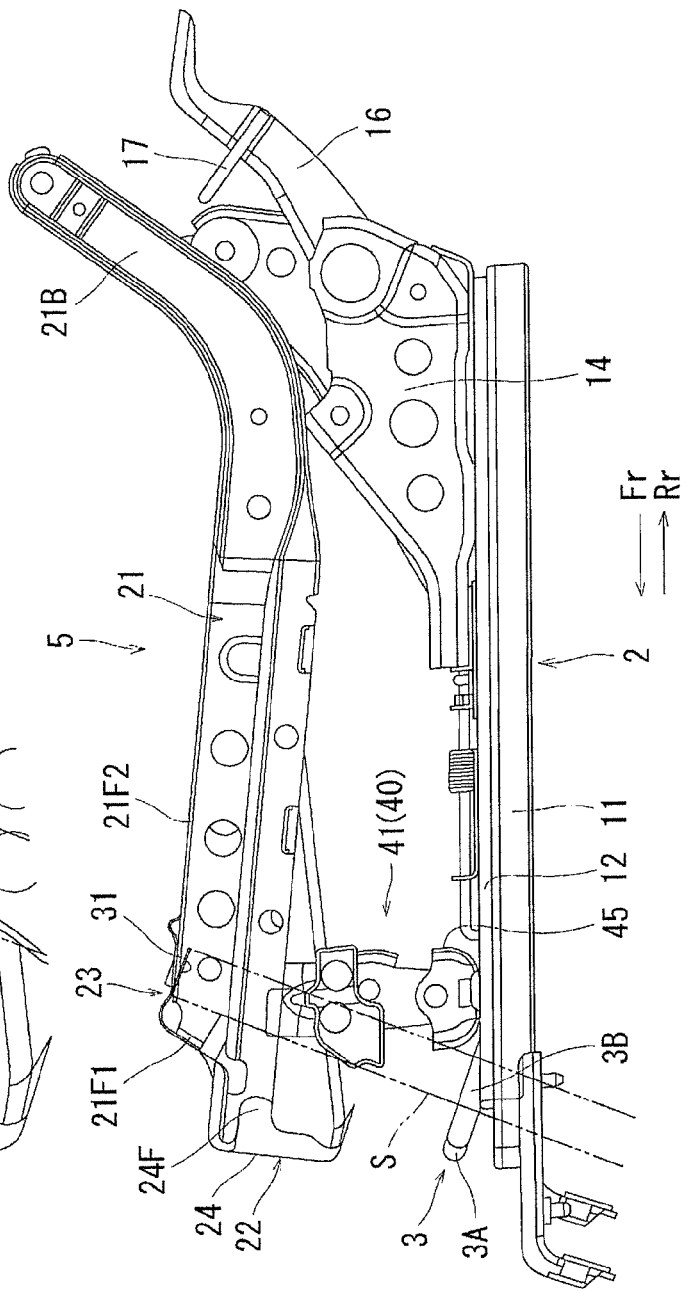

As shown in FIGS. 3(a) and 3(b), the reinforcement front wall 27 is inclined so as to be located closer to the seat front side Fr toward a lower end portion side. Also, as shown in FIGS. 3(a), 3(b), and 5, a reinforcement upper wall portion 26B of the reinforcement upper wall 26 between both seat-widthwise end portions 26A and other than an end portion 26K on the seat rear side Rr is inclined so as to be located upward toward the seat front side Fr. The end portion 26K on the seat rear side Rr is inclined backwardly upward, and its top portion is formed in an arc shape in section that is convex to an upper side. A plurality of weight reducing holes 26H and 27H are provided in parallel in the seat width direction in the reinforcement upper wall 26 and the reinforcement front wall 27.

Furthermore, a pair of right and left coupling surfaces 31 (see FIGS. 2, 3(a), and 3(b)) to which a pair of right and left tilt mechanisms 40 described below are respectively coupled from below are formed at both seat-widthwise end portions of the reinforcement upper wall portion 26B. That is, the coupling surface 31 is inclined forwardly upward so as to be located upward toward the seat front side Fr. As shown in FIG. 2, the coupling surface 31 is located on a front outer side from the second handle portion 3B of the lock release handle 3 as viewed from a direction perpendicular to the coupling surface 31.

Joining Structure for Side Panel 21, Front Panel 22, and Reinforcement 23

As shown in FIGS. 1, 3(a), 3(b), and 5, the lower end portion of the reinforcement front wall 27 is welded and fixed to the upper-side first mounting flanges 21F1 of the pair of right and left side panels 21 so as to overlap therewith from the seat front side Fr. Also, the lower end portion of the reinforcement front wall 27 is welded and fixed to the third mounting flanges 28F of the front panel upper wall 28 so as to overlap therewith from the seat rear side Rr. Furthermore, the both seat-widthwise end portions 26A of the reinforcement upper wall 26 are welded and fixed to the second mounting flanges 21F2 of the side panels 21 so as to overlap therewith from the upper side. The fourth mounting flange 24F of the front panel 22 is welded and fixed to the lower-side first mounting flange 21F1 of the side panel 21 so as to overlap therewith from the seat front side Fr.

Structure of Tilt Mechanism 40

As shown in FIGS. 3(a), 3(b), and 4, the tilt mechanism 40 (corresponding to a device mechanism) is provided between the movable rail 12 of the slide rail 2 and the reinforcement upper wall 26. The tilt mechanism 40 includes a link mechanism 41 interposed between the movable rail 12 and the reinforcement 23, and raising and lowering means (not shown) that raises and lowers a front end portion of the seat cushion 1. The tilt mechanism 40 adjusts a seat angle of the seat cushion 1 according to preference.

As shown in FIG. 4, the link mechanism 41 is composed of a lower-side link member 42 and an upper-side link member 43 coupled together rotatably about a first lateral axis O1. An upper end portion 43A of the upper-side link member 43 is bent to the seat-widthwise inner side W1 with respect to a remaining portion 43B (a portion other than the upper end portion). That is, the upper-side link member 43 is formed in an L shape. The upper end portion 43A of the upper-side link member 43 includes a bolt insertion hole, and is coupled to the coupling surface 31 of the reinforcement upper wall 26 by a bolt B and a nut N (see FIG. 1). The nut N is welded and fixed to an upper surface of the reinforcement upper wall 26.

A coupling rod 44 is suspended between the pair of right and left lower-side link members 42. A lower end portion of the lower-side link member 42 is coupled to a support bracket 45 erected from an upper surface of the movable rail 12 so as to be rotatable about a second lateral axis O2.

Structure of Comparative Example

Figure 7:
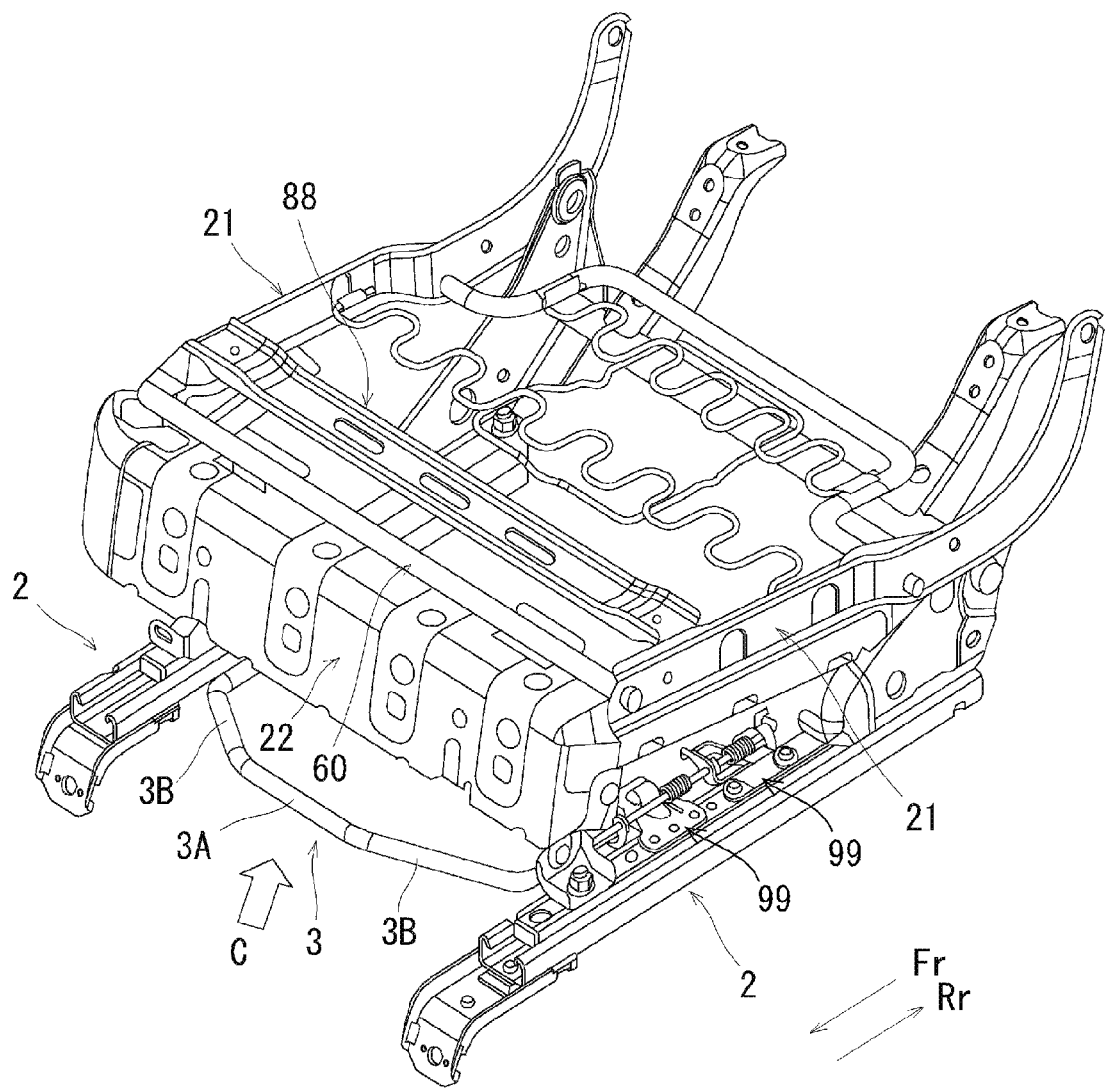
FIG. 7 is a perspective view of a seat frame and a slide rail in a mounted state as a view illustrating a comparative example.
Figure 8:
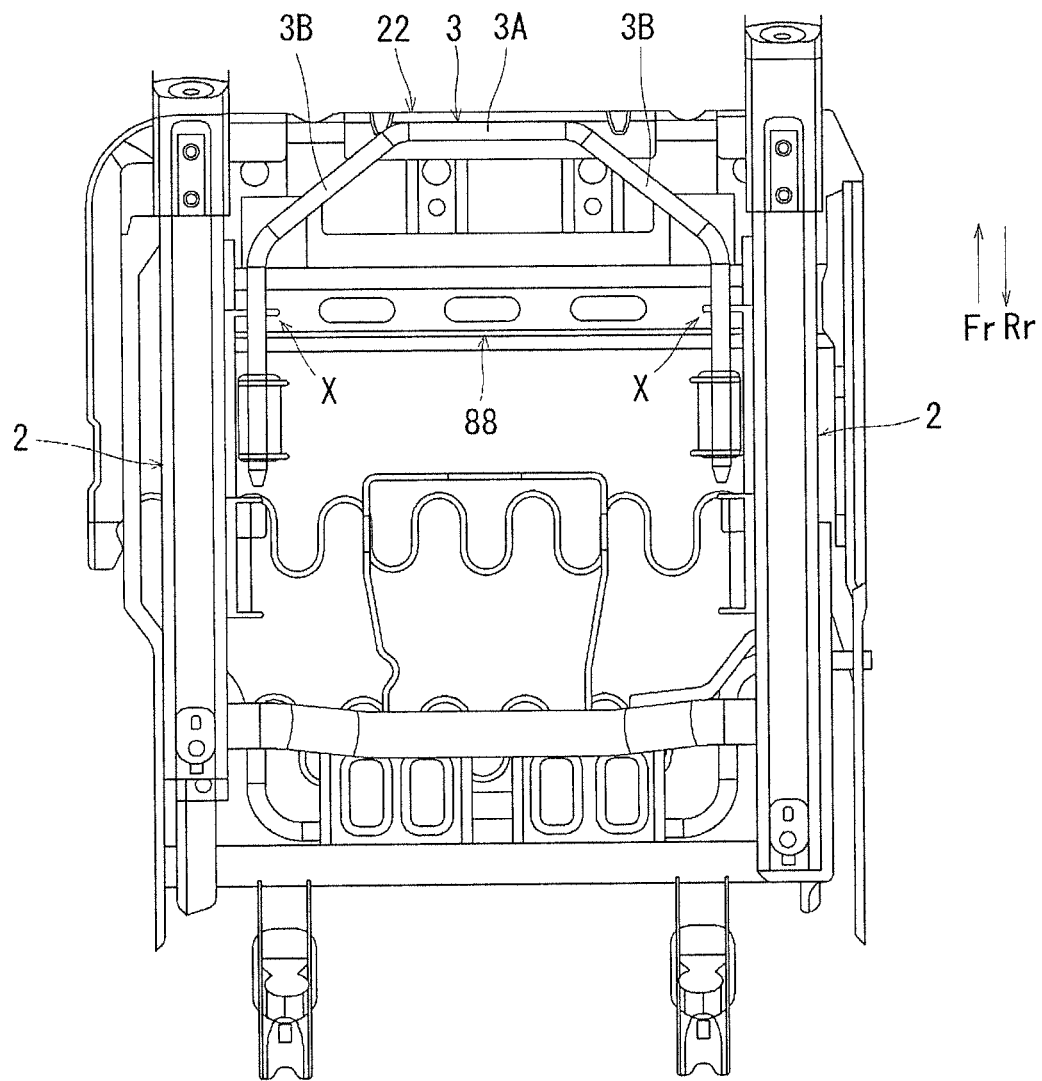
FIG. 8 is a view on an arrow C in FIG. 7 as a view illustrating the comparative example.

FIGS. 7 and 8 show a structure of a comparative example.

In the structure of the comparative example, a pipe material 60 as a strength member that ensures the strength of the entire seat frame is suspended between the front portions of the pair of right and left side panels 21. The pipe material 60 may be used to receive the front end portion of the child restraint system to prevent the front end portion from sinking downward. However, since a seat front-rear length of the child restraint system is less than a seat front-rear length of the seat cushion 1, the pipe material 60 cannot receive the front end portion of the child restraint system. Therefore, a band plate-like reinforcement 88 that prevents the child restraint system from sinking is suspended between the front portions of the pair of right and left side panels 21 in addition to the pipe material 60.

In the structure, there is a problem that the number of components and the weight are increased since the reinforcement 88 that prevents the child restraint system from sinking needs to be further provided in addition to the pipe material 60.

Also, the reinforcement 88 is arranged to the seat rear side Rr from the pipe material 60 in alignment with the front end of the child restraint system. Thus, as shown in FIG. 8, there is a problem that a tool for coupling the link mechanism of the tilt mechanism to the reinforcement 88 cannot be allowed to reach a coupling portion X of the reinforcement 88 since the lock release handle 3 becomes an obstacle.

On the other hand, in accordance with the aforementioned configuration of the present invention:

(1) The reinforcement 23 prevents the front end portion of the child restraint system from sinking downward into the seat cushion 1. Therefore, even when a forward impact force is applied to a vehicle body to apply a load to a front side (the seat front side Fr) to the child restraint system installed on the seat cushion 1, the front end portion of the child restraint system can be prevented from sinking into the seat cushion 1, so that a child can be stably restrained by the child restraint system.

Also, since the front end portion of the reinforcement 23 is fixed to the front panel 22, the reinforcement 23 also functions as a strength member that ensures the strength of the entire seat frame 5. Accordingly, a pipe material as a strength member that is suspended between the front end portions of the pair of right and left side panels 21 can be omitted, thereby reducing the number of components and achieving weight saving.

Furthermore, at a front portion of the seat frame 5, a reinforcement structure having an L shape in section is formed by the reinforcement 23 and the front panel 22 from a position where the front end portion side of the child restraint system is arranged to the front surface side of the seat frame 5. As a result, the reinforcement structure has a box-like shape that opens on a lower side and a rear side. Therefore, even when the reinforcement 23 and the front panel 22 are formed of a panel material, the reinforcement structure can be provided with high strength, and as compared to a case in which the reinforcement structure is formed of a pipe material, the reinforcement structure can be reduced in weight.

On the other hand, a new problem occurs in the structure in which the pipe material is omitted. That is, the device mechanism such as the tilt mechanism 40 is normally coupled to a bracket fixed to the pipe material. Therefore, in the case of the structure in which the pipe material is omitted, the device mechanism is coupled to the reinforcement 23. However, a main portion (the reinforcement upper wall 26) of the reinforcement 23 where a wide coupling surface can be ensured with respect to the device mechanism is arranged to the seat rear side Rr from a position where the pipe material is arranged in alignment with the front end portion of the child restraint system. Thus, there occurs a problem that a tool cannot be allowed to reach the coupling surface side of the reinforcement 23 since the lock release handle 3 becomes an obstacle in a coupling operation of the tilt mechanism 40 to the reinforcement 23.

On the other hand, in the aforementioned configuration of the present invention, the reinforcement 23 extends to the front panel 22 side. Furthermore, the coupling surface 31 of the reinforcement 23 to which the tilt mechanism 40 is coupled is inclined forwardly upward so as to be located upward toward the seat front side Fr (see FIGS. 3(a) and 3(b)), and the coupling surface 31 is located on the front outer side from the second handle portion 3B as viewed from the direction perpendicular to the coupling surface 31 (see FIG. 2).

Therefore, when the tilt mechanism 40 is coupled to the coupling surface 31 of the reinforcement 23, a tool insertion space S (see FIGS. 2, 3(a), and 3(b)) can be ensured. As a result, interference of the tool with the second handle portion 3B can be avoided, and the tool can be caused to smoothly reach the coupling surface 31 side of the reinforcement 23 from below. Accordingly, the tilt mechanism 40 can be coupled to the coupling surface 31 of the reinforcement 23. That is, deterioration in the mountability of the tilt mechanism 40 to the reinforcement 23 can be avoided, ensuring the mountability.

Although the tilt mechanism 40 is coupled to the bracket fixed to the pipe material in the conventional case, the tilt mechanism 40 is coupled to the coupling surface 31 of the reinforcement 23 in the aforementioned configuration of the present invention, so that the bracket is not required. As a result, the number of components, the weight, and the labor can be further reduced.

(2) The link mechanism 41 of the tilt mechanism 40 can be arranged immediately below the reinforcement 23. Accordingly, when a forward load is applied to the child restraint system, the link mechanism 41 can receive a load on the seat cushion 1 in a direction in which the front end portion of the child restraint system sinks from immediately below.

Therefore, as compared to a case in which the link mechanism 41 receives the load at a position other than from immediately below, a moment load is not applied to the link mechanism 41, so that a burden on the link mechanism 41 can be reduced, and the durability of the tilt mechanism 40 can be improved.

(3) The reinforcement 23 can be formed in an L shape in section by the reinforcement upper wall 26 and the reinforcement front wall 27, and thus improved in strength. Moreover, since the reinforcement front wall 27 is inclined so as to be located closer to the seat front side Fr toward the lower end portion side, the reinforcement front wall 27 more effectively acts as a strut against the front panel 22 when, for example, the front end portion of the child restraint system is to sink into the seat cushion 1 to apply a load to the reinforcement 23 in a rotation direction to the front side. Accordingly, the strength of the reinforcement 23 against the sinking of the front end portion of the seat cushion 1 can be improved.

REFERENCE SIGNS LIST

1 Seat cushion
2 Slide rail
3 Lock release handle
3A First handle portion
3B Second handle portion
5 Seat frame
21 Side frame (side panel)
22 Front panel
23 Reinforcement
24 Front panel front wall
26 Reinforcement upper wall
27 Reinforcement front wall
28 Front panel upper wall
31 Coupling surface
40 Device mechanism (tilt mechanism)
41 Link mechanism
42 Lower-side link member
43 Upper-side link member
43A Upper end portion of the upper-side link member
Fr Seat front side
Rr Seat rear side
O1 Lateral axis (first lateral axis)
O2 Lateral axis (second lateral axis)
W1 Seat-widthwise inner side
W2 Seat-widthwise outer side

The invention claimed is:

1. A vehicle seat comprising:
a seat cushion on which a child restraint system can be installed; and
a pair of right and left slide rails that support the seat cushion so as to be slidable in a seat front-rear direction,
wherein locking mechanisms that lock the seat cushion to prevent the sliding of the seat cushion on the slide rails are provided at the pair of right and left slide rails,
a lock release handle that releases the lock by the locking mechanisms is suspended between the pair of right and left slide rails,
the lock release handle includes a first handle portion on a center of a seat-widthwise, and a second handle portion that is located on a seat-widthwise outer side from the first handle portion, and extends obliquely backward from an end portion of the first handle portion so as to be located closer to a seat rear side toward the seat-widthwise outer side,
a seat frame of the seat cushion includes
a pair of right and left side frames,
a front panel that is suspended between front end portions of the pair of right and left side frames to form a front surface portion of the seat frame, and
a reinforcement that is suspended between front portions of the pair of right and left side frames so as to be located on the seat rear side from the front panel, and prevents a front end portion of the child restraint system from sinking downward into the seat cushion,
a front end portion of the reinforcement is fixed to the front panel,
the reinforcement is provided with a coupling surface to which a device mechanism is coupled from below,
the coupling surface is inclined forwardly upward so as to be located upward toward a seat front side, and
the coupling surface is located on a front outer side from the second handle portion as viewed from a direction perpendicular to the coupling surface.

2. The vehicle seat according to claim 1,
wherein the device mechanism is a tilt mechanism including a link mechanism that is interposed between the pair of right and left slide rails and the reinforcement, and raising and lowering means that raises and lowers a front end portion of the seat cushion,
the link mechanism is composed of a lower-side link member and an upper-side link member coupled together rotatably about a lateral axis,
a lower end portion of the lower-side link member is coupled to the pair of right and left slide rails rotatably about a lateral axis, and
an upper end portion of the upper-side link member is coupled to the coupling surface of the reinforcement.

3. The vehicle seat according to claim 1,
wherein the reinforcement is composed of a reinforcement upper wall, and a reinforcement front wall that extends downward from an end portion on the seat front side of the reinforcement upper wall,
the reinforcement front wall is inclined so as to be located closer to the seat front side toward a lower end portion side, and
the lower end portion of the reinforcement front wall is fixed to the front panel.

4. The vehicle seat according to claim 3,
wherein the front panel is formed in an L shape in section, and is composed of a front panel upper wall, and a front panel front wall that extends downward from an end portion on the seat front side of the front panel upper wall.

\* \* \* \* \*